4 Sheets—Sheet 1.
F. E. SICKELS.
Steam Engine.
No. 911. Reissued Feb. 21, 1860.
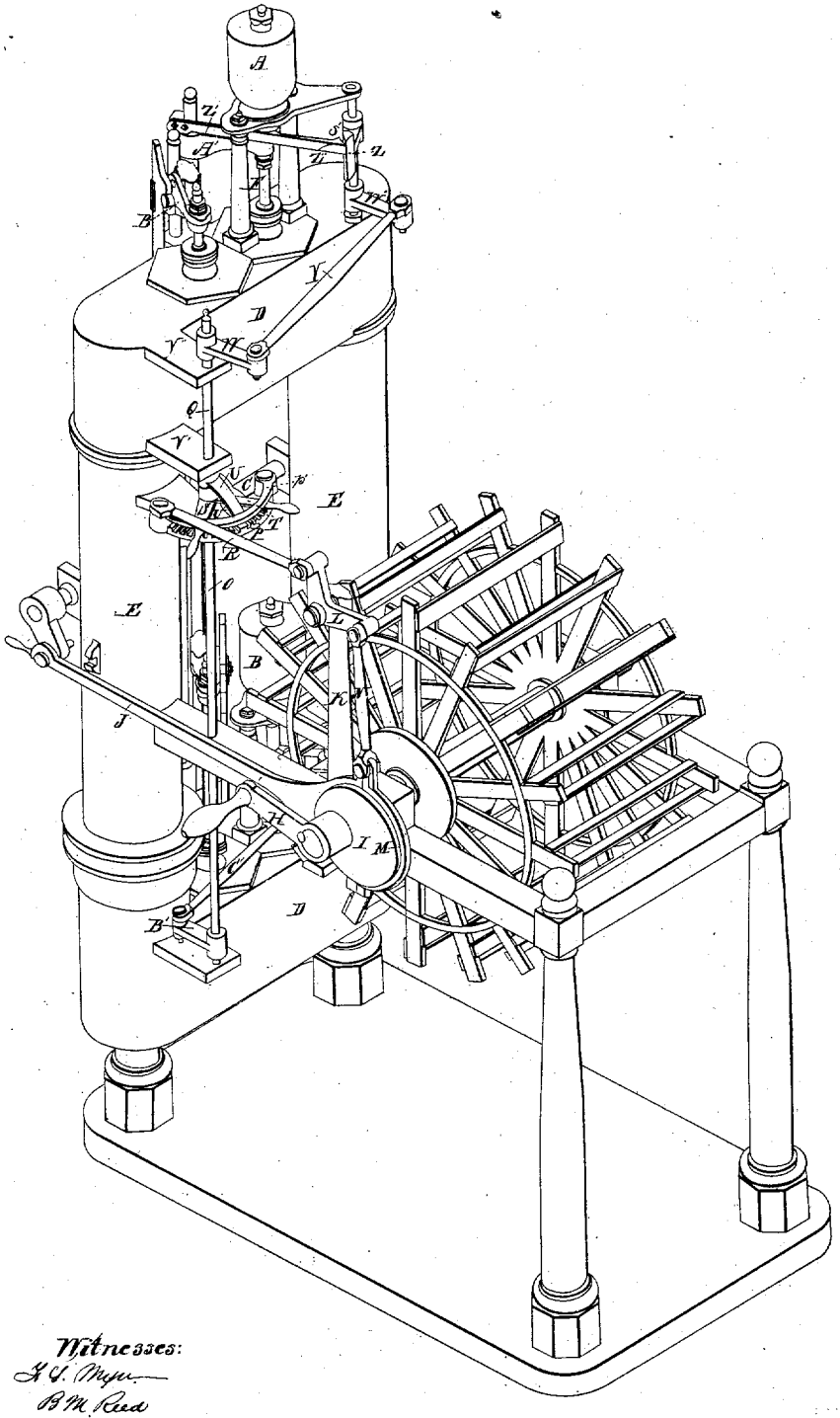
Witnesses:
H. S. Myers
B. M. Reed
Inventor:
F. E. Sickels
N. PETERS, Photo-Lithographer, Washington, D. C.

4 Sheets—Sheet 2.
F. E. SICKELS.
Steam Engine.
No. 911.
Reissued Feb. 21, 1860.
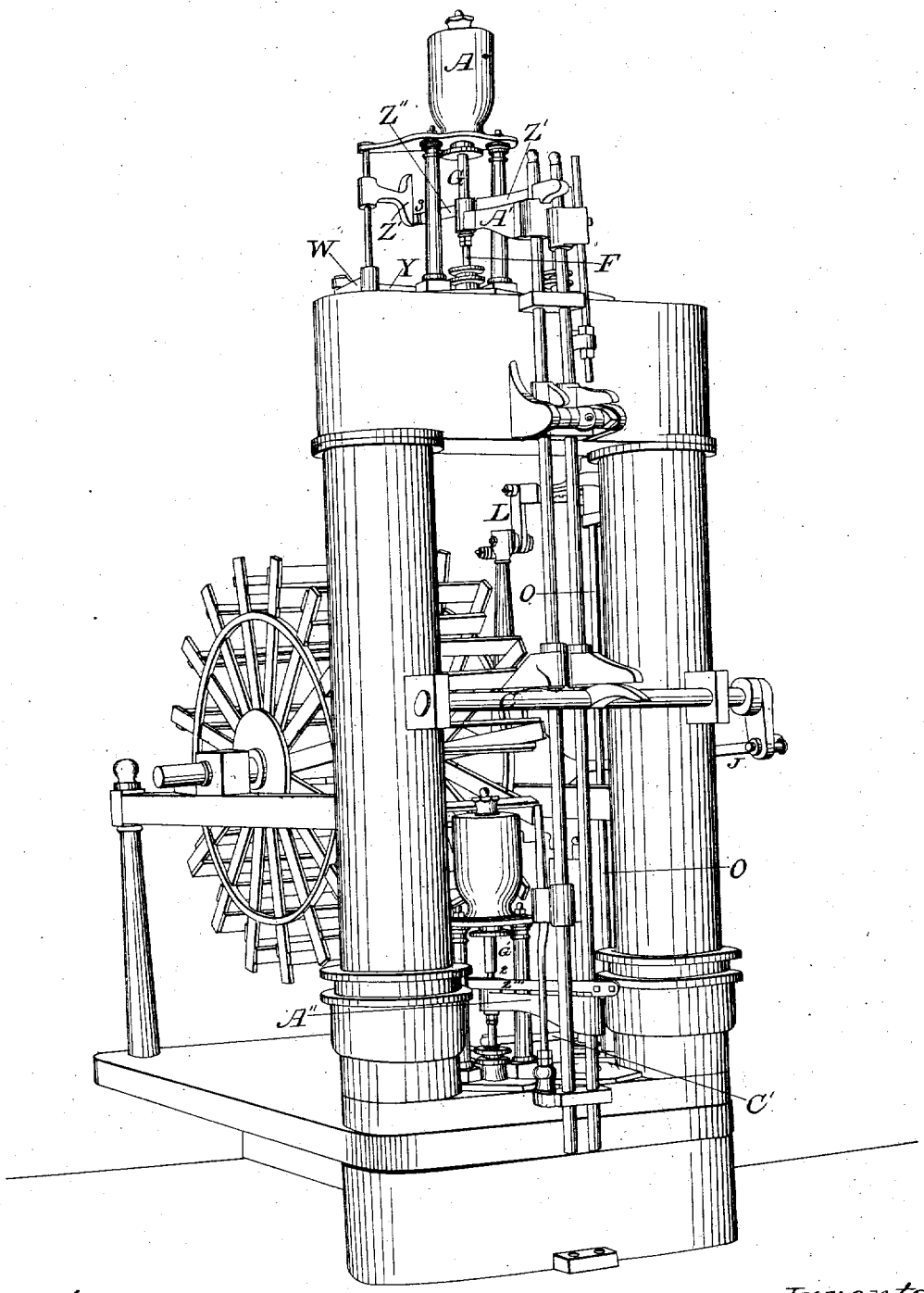
Witnesses:
H. S. Mynn
B. McRee
Inventor:
F. E. Sickels
N. PETERS, Photo-Lithographer, Washington, D. C.

4 Sheets—Sheet 3.
F. E. SICKELS.
Steam Engine.
No. 911. Reissued Feb. 21, 1860.
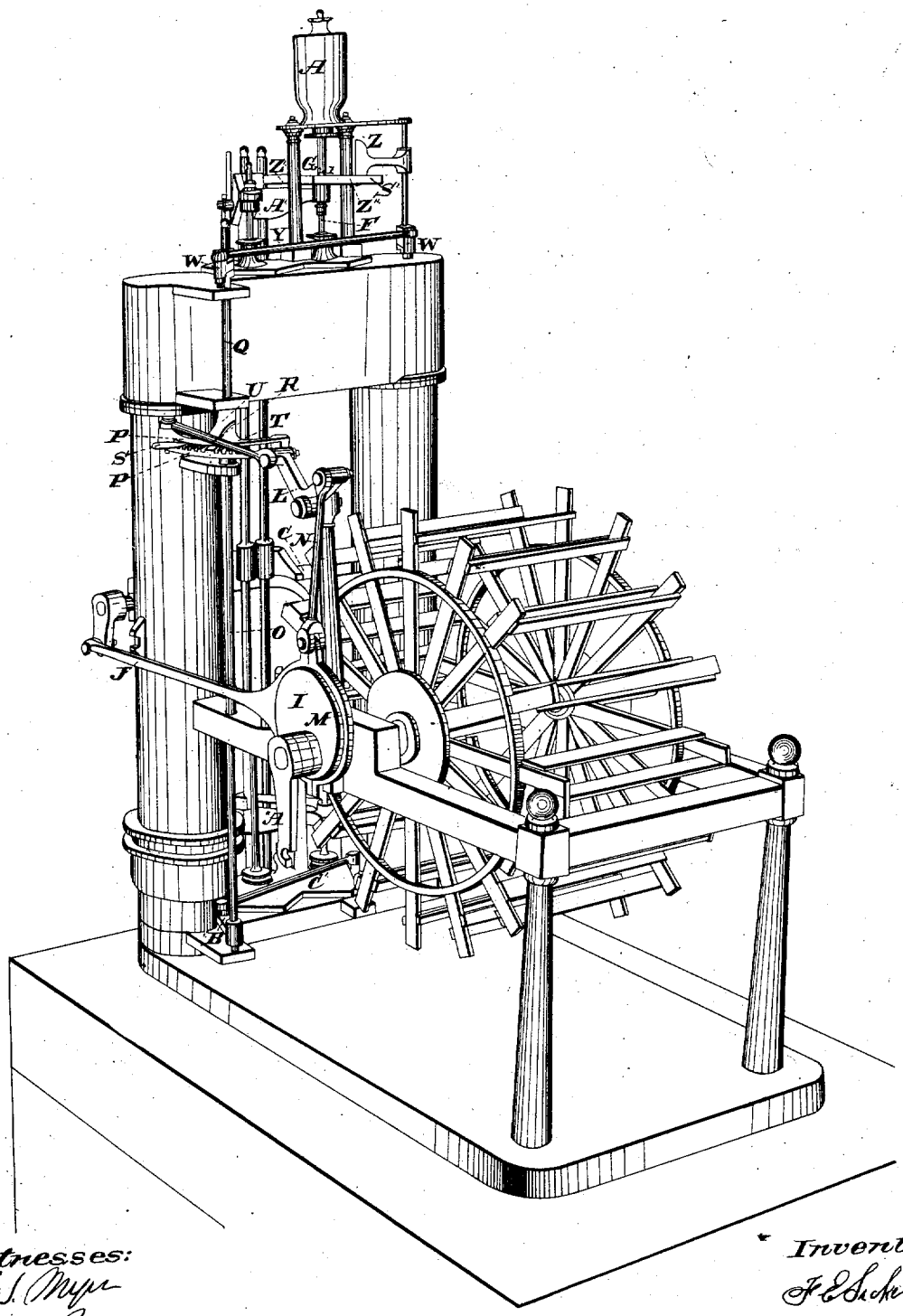
Witnesses:
H. S. Myer
B. M. Reed
Inventor:
F. E. Sickels
N. PETERS, Photo-Lithographer, Washington, D. C.

4 Sheets—Sheet 4.
F. E. SICKELS.
Steam Engine.
No. 911. Reissued Feb. 21, 1860.
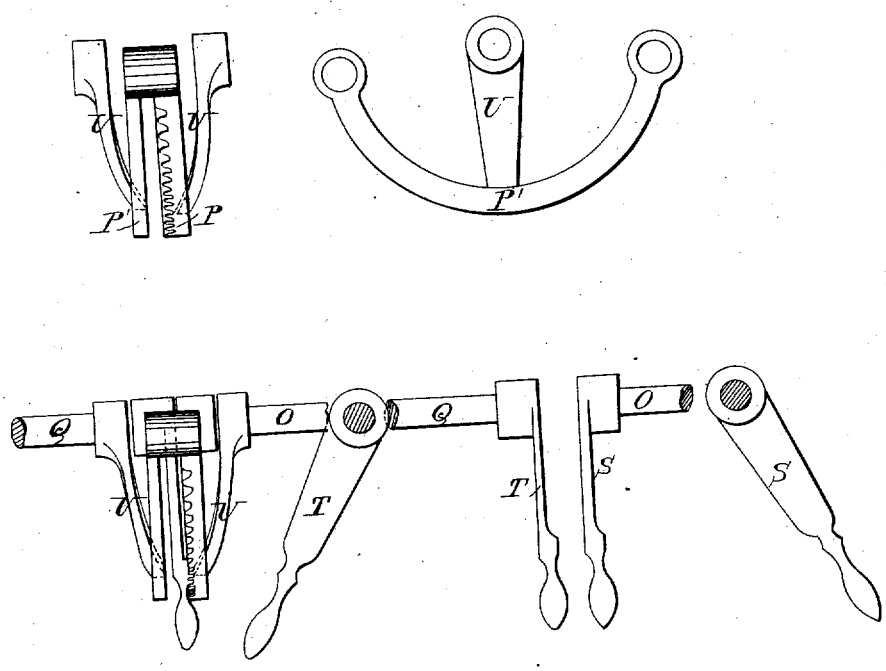
Witnesses:
J. S. Myers
B. M. Reed
Inventor:
F. E. Sickels
N. PETERS, Photo-Lithographer, Washington, D. C.

UNITED STATES PATENT OFFICE.

FREDERICK F. SICKELS, OF NEW YORK, N. Y.

IMPROVEMENT IN STEAM-ENGINES.

Specification forming part of Letters Patent No. 4,202, dated September 19, 1845; extended 7 years; Reissue No. 911, dated February 21, 1860.

DIVISION No. 5.

*To all whom it may concern:*

Be it known that I, FREDERICK ELSWORTH SICKELS, of the city, county, and State of New York, have invented a new and useful Improvement in Steam-Engines; and that the following is a full, clear, and exact description of the character thereof, which distinguishes it from all other things before known, and of the manner of making and using the same, reference being had to the accompanying drawings, which make a part of this specification.

The nature of my invention consists in an adjustable—that is, adjustable while the engine is in operation—mechanism, moved by the engine, so that by changing the relative position of the parts it will alter the time when the weight, spring, or other independent force shall close two separate moving cut-off valves without altering the time or encountering the resistance of opening them, thereby rendering them more applicable as the main admitting-valves of the engine, and more easily adjustable as cut-off valves.

In the accompanying drawings, Sheets Nos. 1, 2, and 3, three views are shown of this improvement, in connection with others patented to me the same day as this, and they will be described in part to facilitate the explanation of the improvement herein patented, notwithstanding it may be used without them.

The same letters refer to the same parts in each figure.

F is a valve rod or stem having a piston or plunger attached to its upper end, operating within a reservoir, A, shaped smaller at the bottom, which may confine the fluid contained therein, substantially in the same manner as described in the patent granted to me the 20th of May, 1842, so as to regulate the velocity of a falling weight connected to the stem that is sufficient to overcome all friction in closing the valve. To this rod or stem the valve must be attached. Either single, double, or slide valves may be used. A spring, Z′, has a catch-piece, Z″, connected to it that fits into a notch formed by the catch G, and extends beyond, which piece Z″ has a curve projection, S, at the extreme end, against which the outer face of the arm or wiper Z strikes as it vibrates on its vertical axis. The outer face of this arm or wiper is parallel with its shaft or axle, and is of greater length than the motion of the lifter, so that it can act upon the curved projection on the catch-piece Z″ as it is carried up and down by the lifter, so as to determine the time when the weight shall close the valve. The vibratory motion of the arm or wiper Z is obtained in the following manner: On its axle there is an arm, W, connected by a rod, Y, with a similar arm, W′, on the upper end of a vertical shaft, Q, which has a spring-arm, T, at its lower end (the outer end handle form) with its under face provided with a fillet or catch to fall into the teeth on the upper end of the sector P, that vibrates on the shaft Q, that is held by means of arms U U, that project from two collars that turn one on the lower end of this shaft Q and the other on the upper end of a corresponding shaft, O, below it. From one end of this sector a connecting-rod, R, extends to one arm of a bell-crank, L, the other arm of which is connected by a connecting-rod, N, with the strap M of the eccentric I, and at right angles to the eccentric-rod J that operates the rock-shaft C of the lifters A′ A″, so that the sector P and the parts deriving motion from it are moving while the lifters are in a state of rest, and therefore the liberation of the weight to close the valve will be more rapid and can be regulated with more accuracy at this period of the stroke of the piston than if this lifter-motion alone was used. The shaft O, which is below, has a spring-arm, S, similar and corresponding to the one, T, before described, and at its lower end an arm, B′, and connecting-rods C′, corresponding with the arm W and rod Y above, and all other corresponding parts to work the cut-off valve for this end of the cylinder are substantially the same as the parts above described for the other end of the cylinder. The sector P has a plate, P′, above and parallel with it, for the purpose of strength and to act as a guard for the spring-arms S T. The face of the sector P is provided with two sets of teeth, each extending from the middle or arms U U to the ends, and the length of each part of the sector is such that the motion of the spring-arms S T, from one extremity to the other of the sector, shall shift the position of the arm or wiper Z and the corresponding one below so that when the spring-arms are at the outer end of the segment the arms or wipers shall vibrate without permitting the weights or other force to move the valves to cut off, and by moving them toward the middle the extent of the cut-off shall be reduced from the maximum to the minimum—that is to say, to cut off from the greatest to the least portion of the stroke without altering the time or transmitting the force of opening the valves.

It will be evident from the foregoing that any motion derived from any part of the engine may be substituted for the motion of the arms or wipers, provided it has motion as distinguished from the lifter-motion—as, for instance, instead of the horizontal vibratory motion of the arms or wipers, the time when the weight may be permitted to act to close the cut-off valve may be regulated by a vertical descending motion as the lifter rises, and in this case it will be by the co-operation of this motion with another motion that a more restricted regulation is effected, and the independent motion may be derived from any moving parts of engine other than the lifter—that is, the piston-rod, the beam, crank, shaft, &c.—and other mechanism than the connecting and disconnecting trip and catch may be used in transferring the weight from the mechanism that lifts it to the mechanism that regulates its fall, and other mechanism than this for regulating its fall and raising it may be used, and other valve-motions for opening the valves without transmitting the force to open through the adjustable mechanism may be used in carrying out this invention.

Sheet No. 4 shows the plan and elevation of parts before described, it being understood that the form and arrangement of them will depend in each case, as in this, upon the general arrangement of the valve gear, and to which attention is particularly required in order to understand this invention.

S T are spring-arms, T connected with its upper shaft, Q, and S with its lower shaft, O. P and P′ are the sector and guard-piece. U U are arms connected to bosses turning loosely on the shafts Q and O, being operated through the sector P by a connecting-rod, R, with a fixed motion. The relative positions of the sector with other parts of the mechanism being adjustable by changing the position of the arms S T in the sector—S for one valve and T for the other—and this is readily done as the cams, arms, or wipers are only in contact to cut off with the mechanism opening the valves at the time of determining the action of the weight and after the valves are open.

What I claim as new, and desire to secure by Letters Patent, is—

An adjusting mechanism so arranged that the relative position of its parts during any portion of its movement by the engine can be changed to alter the closing action of the weight that operates the cut-offs without altering the time or encountering the resistance of opening the two separate-moving cut-off valves.

FREDERICK E. SICKELS.

Witnesses:
C. W. GEDDES,
F. S. MYER.